US012188831B2

(12) United States Patent
Wu et al.

(10) Patent No.: US 12,188,831 B2
(45) Date of Patent: Jan. 7, 2025

(54) BRDF MEASUREMENT SYSTEM AND METHOD, ELECTRONIC DEVICE, AND STORAGE MEDIUM

(71) Applicant: National Institute of Metrology, China, Beijing (CN)

(72) Inventors: Zhifeng Wu, Beijing (CN); Caihong Dai, Beijing (CN); Ling Li, Beijing (CN); Yanfei Wang, Beijing (CN); Sijie He, Beijing (CN)

(73) Assignee: National Institute of Metrology, China, Beijing (CN)

( * ) Notice: Subject to any disclaimer, the term of this patent is extended or adjusted under 35 U.S.C. 154(b) by 0 days.

(21) Appl. No.: 18/488,836

(22) Filed: Oct. 17, 2023

(65) Prior Publication Data
US 2024/0133749 A1    Apr. 25, 2024

(30) Foreign Application Priority Data
Oct. 18, 2022  (CN) .......................... 202211270526.2

(51) Int. Cl.
*G01J 5/02*    (2022.01)
*G01J 3/02*    (2006.01)
(Continued)

(52) U.S. Cl.
CPC ............. *G01J 5/601* (2013.01); *G01J 3/0289* (2013.01); *G01J 3/10* (2013.01); *G01J 3/28* (2013.01);
(Continued)

(58) Field of Classification Search
CPC ...... G01J 3/0248; G01J 3/0278; G01J 3/0289; G01J 3/10; G01J 3/28; G01J 5/0205;
(Continued)

(56) References Cited

U.S. PATENT DOCUMENTS 5,505,543 A * 4/1996 Webbeking ........... G01J 5/0003
374/129
5,637,873 A    6/1997 Davis et al.
(Continued)

FOREIGN PATENT DOCUMENTS

CN    102749306 A    10/2012
CN    113138027 A    7/2021
(Continued)

*Primary Examiner* — Mark R Gaworecki
(74) *Attorney, Agent, or Firm* — Knobbe Martens Olson & Bear LLP (57) ABSTRACT

A bidirectional reflectance distribution function (BRDF) measurement system and method, an electronic device, and a storage medium. The BRDF measurement system includes: a blackbody, a spectroradiometer and a controller; where in case that the blackbody is heated to a target temperature, it undergoes a solid-liquid phase change; the spectroradiometer is used to measure the blackbody and transmit a first measurement signal to the controller, and in case that the blackbody irradiates a to-be-measured point on a sample surface, the spectroradiometer is further used to measure radiation from the to-be-measured point, and transmit a second measurement signal to the controller; and the controller is used to obtain a BRDF of the to-be-measured point based on the first measurement signal, the second measurement signal, the target geometric relationship, a target mapping relationship and a dimension parameter of the blackbody.

10 Claims, 3 Drawing Sheets

(51) Int. Cl.
   *G01J 3/10*      (2006.01)
   *G01J 3/28*      (2006.01)
   *G01J 5/08*      (2022.01)
   *G01J 5/60*      (2006.01)
   *G01N 21/55*     (2014.01)
   *G01J 3/42*      (2006.01)

(52) U.S. Cl.
   CPC ............ *G01J 5/0205* (2013.01); *G01J 5/027* (2013.01); *G01J 5/0887* (2013.01); *G01N 21/55* (2013.01); *G01J 3/0248* (2013.01); *G01J 3/0278* (2013.01); *G01J 2003/425* (2013.01)

(58) Field of Classification Search
   CPC .......... G01J 5/027; G01J 5/0887; G01J 5/601; G01J 2003/425; G01N 21/55
   See application file for complete search history.

(56) References Cited

U.S. PATENT DOCUMENTS

| | | | |
|---|---|---|---|
| 6,921,898 B1 | 7/2005 | Chen | |
| 6,982,794 B1 * | 1/2006 | Davis | G01N 21/55 250/341.8 |
| 8,067,738 B1 * | 11/2011 | Heath | G01J 3/36 250/338.1 |
| 2003/0133121 A1 | 7/2003 | Davis et al. | |

FOREIGN PATENT DOCUMENTS

| | | | | |
|---|---|---|---|---|
| CN | 113639867 A | | 11/2021 | |
| EP | 3421953 A1 * | | 1/2019 | ............ G01J 1/0219 |

\* cited by examiner

BRDF MEASUREMENT SYSTEM AND METHOD, ELECTRONIC DEVICE, AND STORAGE MEDIUM

CROSS-REFERENCE TO RELATED APPLICATIONS

All applications for which a foreign or domestic priority claim is identified in the Application Data Sheet as filed with the present application are hereby incorporated by reference.

FIELD

The present application relates to the field of optical measurement, and in particular to a BRDF measurement system and method, an electronic device, and a storage medium.

BACKGROUND

The bidirectional reflectance distribution function (BRDF) defines the relationship between the spectral irradiance of the incident light and the spectral radiance of the outgoing light. That is, the BRDF can be used to describe the spectral and the spatial reflectance characteristics of a sample surface. The BRDF has great significance for researchers of optical radiation.

In the related art, the BRDF may be measured based on a traditional system for BRDF measurement. However, the measurement accuracy of a traditional BRDF measurement system is low. How to improve the measurement accuracy of a BRDF measurement system is an urgent problem that needs to be solved.

SUMMARY

The present application provides a BRDF measurement system and method, an electronic device, and a storage medium, which solves the low measurement accuracy defect of a traditional BRDF measurement system, and improves the measurement accuracy of the BRDF measurement system.

The present application provides a BRDF measurement system, including: a blackbody, a spectroradiometer and a controller,
where the spectroradiometer is connected to the controller;
in case that the blackbody is heated to a target temperature, it undergoes a solid-liquid phase change;
the spectroradiometer is used to measure the blackbody and transmit a first measurement signal to the controller, and in case that the blackbody irradiates a to-be-measured point on a sample surface, the spectroradiometer is further used to measure radiation from the to-be-measured point, and transmit a second measurement signal to the controller; and
the controller is used to obtain a BRDF of the to-be-measured point based on the first measurement signal, the second measurement signal, a target geometric relationship, a target mapping relationship and a dimension parameter of the blackbody,
where the target geometric relationship includes a geometric relationship between the spectroradiometer, the blackbody and the to-be-measured point, and the target mapping relationship includes a mapping relationship between sensitivities of the spectroradiometer at different spectral radiances.

In the BRDF measurement system provided by the present application, the spectroradiometer is provided with an eyepiece; and
the spectroradiometer aims a position of the to-be-measured point based on the eyepiece.

In the BRDF measurement system provided by the present application, it further includes: a nonlinear measurement device connected to the controller,
where the nonlinear measurement device is used to calibrate a linearity of the spectroradiometer, obtain the target mapping relationship, and transmit the target mapping relationship to the controller before the spectroradiometer measures radiation from the blackbody, and before the spectroradiometer measures radiation from the to-be-measured point in case that the blackbody irradiates the to-be-measured point.

In the BRDF measurement system provided by the present application, fields of view provided by the spectroradiometer include a first field of view and a second field of view, where the first field of view is greater than the second field of view; and
the spectroradiometer uses the second field of view to measure radiation from the blackbody, and uses the first field of view to measure radiation from the to-be-measured point in case that the blackbody irradiates the to-be-measured point.

In the BRDF measurement system provided by the present application, it further includes: a measurement device connected to the controller,
where the measurement device is used to obtain relative position information between the blackbody, the spectroradiometer and the to-be-measured point in case that the blackbody irradiates the to-be-measured point, and transmits the relative position information to the controller; and
the controller is used to obtain the target geometric relationship based on the relative position information.

In the BRDF measurement system provided by the present application, it further includes: a mechanical device, where the mechanical device connected to the controller, and further connected to the blackbody and the spectroradiometer,
where the controller is used to obtain the target geometric relationship based on a user input and transmit a control instruction corresponding to the target geometric relationship to the mechanical device; and
the mechanical device is used to control a position of the blackbody and/or the spectroradiometer in response to the control instruction.

In the BRDF measurement system provided by the present application, the controller is used to obtain a first spectral radiance based on the first measurement signal and the target mapping relationship, obtain a second spectral radiance based on the second measurement signal and the target mapping relationship, and obtain the BRDF of the to-be-measured point based on the first spectral radiance, the second spectral radiance, the target geometric relationship and the dimension parameter of the blackbody.

The present application further provides a BRDF measurement method, performed by any of the above-mentioned BRDF measurement systems, including:
obtaining a first measurement signal by enabling a spectroradiometer to measure radiation from a blackbody;
obtaining a second measurement signal by enabling the spectroradiometer to measure a radiation from a to-be-measured point on a sample surface in case that the blackbody irradiates the to-be-measured point; and obtaining a BRDF of the to-be-measured point based on the first measurement signal, the second measurement signal, a target geometric relationship, a target mapping relationship and a dimension parameter of the blackbody, where the target geometric relationship includes the geometric relationship between the spectroradiometer, the blackbody and the to-be-measured point, where the target mapping relationship includes a mapping relationship between sensitivities of the spectroradiometer at different spectral radiances.

The present application further provides an electronic device, including a memory, a processor and a computer program executable on the processor, where the processor, when executing the computer program, performs any of the above-mentioned BRDF measurement methods.

The present application further provides a non-transitory computer readable storage medium having a computer program stored thereon, where the computer program, when executed by a processor, performs any of the above-mentioned BRDF measurement methods.

The present application further provides a computer program product, including a computer program, where the computer program, when executed by a processor, performs any of the above-mentioned BRDF measurement methods.

The present application provides a BRDF measurement system and method, an electronic device and a storage medium, where the BRDF measurement system includes a blackbody that undergoes the solid-liquid phase change upon being heated to the target temperature, the spectroradiometer and the controller. By the BRDF measurement system, the BRDF of the to-be-measured point on the sample surface can be obtained based on the first measurement signal obtained by enabling the spectroradiometer to measure the radiation from a blackbody, the second measurement signal obtained by enabling the spectroradiometer to measure the radiation from the to-be-measured point in case that the blackbody irradiates the to-be-measured point, the geometric relationship between the spectroradiometer, the blackbody and the to-be-measured point, sensitivities of the spectroradiometer at different spectral radiances, and the dimension parameter of the blackbody, which may improve the measurement accuracy and efficiency of the BRDF measurement.

BRIEF DESCRIPTION OF THE DRAWINGS

In order to illustrate the solutions in the present application or the related art, the accompanying drawings to be used in the descriptions of the embodiments or the related art are briefly described below. It should be noted that the accompanying drawings in the following description are some embodiments of the present application, and other drawings may be obtained according to these drawings without creative work for those ordinary skilled technical personnel in the art.

DETAILED DESCRIPTION

In order to clarify the purpose, solutions, and advantages of the present application, the solutions in the present application are described below in conjunction with the accompanying drawings in the present application. It should be noted that the described embodiments are only a part of the embodiments of the present application, and not all of them. Based on the embodiments in the present application, all the other embodiments obtained by a person of ordinary skill in the art without creative labor are within the protection scope of the present application.

In the description of the present application, it should be noted that unless otherwise specified and limited, the terms "mount", "connect", and "connection" should be understood broadly, for example, they may refer to fixed connections, detachable connections, or integrated connections; or they may refer to mechanical connections or electrical connections; or they may refer to direct connections, indirect connections through an intermediate medium, or internal connections between two components. For those ordinary skilled technical personal in the art, the specific meanings of the terms in the present application may be understood based on specific circumstances.

It should be noted that the differences in surface processing and special means have changed the reflection characteristics of normal light on the surface of an object, such as brushed stainless steel, a compact disk (CD), etc. The reflectance characteristics of the surface of the object are usually unique, and a bidirectional reflectance distribution function (BRDF) may be used to describe the spectral and spatial reflectance characteristics of the surface of the object.

Figure 1:
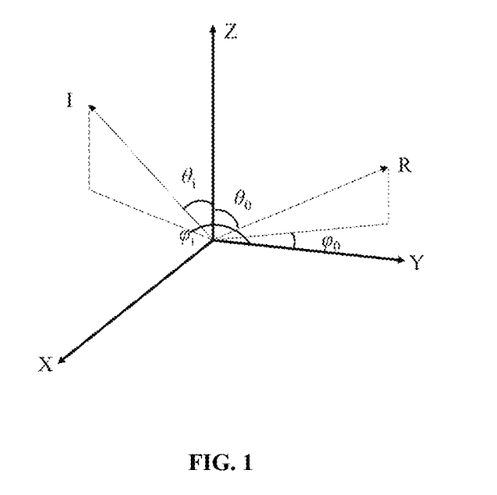
FIG. 1 is a schematic diagram of a principle for measuring BRDF.

FIG. 1 is a schematic diagram of a principle of measuring BRDF. As shown in FIG. 1, in case that an incident light is incident on the surface of an object along the I direction and then exits along the R direction, the BRDR reflectance at the intersection point on the surface of the object may be calculated by the following formula:

$$BRDF(\theta_i, \varphi_i, \theta_o, \varphi_o) = \frac{L(\theta_o, \varphi_o)}{\pi E(\theta_i, \varphi_i)}. \tag{1}$$

A traditional BRDF measurement system typically includes a traditional light source, a multi-dimensional rotation system and a detector, where the multi-dimensional rotation system may rotate in two directions.

Diffuse reflection refers to the phenomenon of light projected on a rough surface reflecting in various directions. A diffuse reflection plate may be approximated as a Lambertian and is widely used in optical radiation research.

When the BRDF of the diffuse reflection plate is measured by using the traditional BRDF measurement system, the diffuse reflection plate is usually fixed on the multi-dimensional rotation system, the multi-dimensional rotation system drives the diffuse reflection plate to rotate, and the traditional light source irradiates the diffuse reflection plate, the BRDF of the diffuse reflection plate may be measured using the detector.

The BRDF measurement on the diffuse reflection plate based on the traditional BRDF measurement system suffers from the following defects: firstly, the stability of the traditional light source is not high, which seriously affects the accuracy of the BRDF measurement on the diffuse reflection plate. Since the detector may only collect light within a small stereo angle in the outgoing direction, the collected signal is small and it is difficult to ensure the measurement signal-to-noise ratio of the outgoing light;

Secondly, any two points on the surface of the diffuse reflection plate may have different reflectance characteristics, and the detector does not have a targeting function, and it is difficult to ensure the accuracy of the BRDF measurement on the diffuse reflection plate.

Thirdly, the traditional light sources usually use a monochromator for splitting beams, to form a single-wavelength light source, or the traditional light source is a single-wavelength laser light source. The detector uses a photomultiplier tube, a silicon detector or an indium gallium arsenic detector. During the measurement process, a single wavelength scanning mode is used for the BRDF measurement, which results in a longer measurement time and a lower measurement efficiency.

The present application provides a BRDF measurement system, including: a blackbody that undergoes a solid-liquid phase change upon being heated to a target temperature, and a spectroradiometer. Based on the BRDF measurement provided by the present application, the BRDF may be measured more accurately and efficiently.

Figure 2:
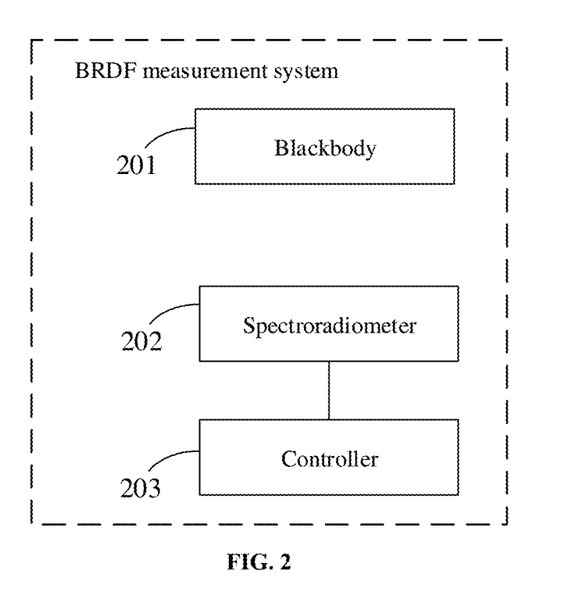
FIG. 2 is a schematic structural diagram of a BRDF measurement system according to the present application.

FIG. 2 is a schematic structural diagram of a BRDF measurement system according to the present application. the BRDF measurement system provided by the present application is described below in conjunction with FIG. 2. As shown in FIG. 2, the BRDF measurement system includes: a blackbody 201, a spectroradiometer 202 and a controller 203, where the spectroradiometer 202 is connected to the controller 203.

In case that the blackbody 201 is heated to a target temperature, it undergoes a solid-liquid phase change.

In an embodiment of the present application, the high-temperature fixed point blackbody 201, which undergoes the solid-liquid phase change, is used as a light source in the BRDF measurement system.

The temperature of the blackbody 201 remains unchanged during the phase change. In case that the blackbody 201 is heated to the target temperature, the blackbody 201 begins to change from a solid state to a liquid state. Although it continues to absorb heat, more of the solid blackbody 201 is converted into liquid blackbody 201. The temperature of the blackbody 201 changes only in case that all the blackbody 201 is completely changed to the liquid state. The temperature of the blackbody 201 remains constant throughout the entire phase change period.

Since the spectral radiance of the blackbody 201 is associated with the temperature of the blackbody 201, and the spectral radiance of the blackbody 201 remains constant throughout the phase change, the stability of the blackbody 201 is much higher than the stability of the conventional light source used in a traditional BRDF measurement method. Measuring the BRDF using the blackbody 201 may improve the accuracy of the BRDF measurement.

The ambient temperature of the blackbody 201 is room temperature. The blackbody 201, as a whole, is internally connected by a graphite ring. The portion that undergoes the solid-liquid phase change is approximately located in the middle of the graphite ring, and is made of a metallic carbon-carbon eutectic point material with a diameter ranging from a few millimeters to more than ten millimeters.

It should be noted that the target temperature is determined based on the properties of the blackbody 201. In embodiments of the present application, the target temperature is not specifically limited.

For example, the blackbody 201 may be a WC-C blackbody, and the target temperature may be 3021 K accordingly.

For example, the blackbody 201 may further be a Re-C blackbody, and the target temperature may be 2747 K accordingly.

It should be noted that the BRDF measurement system provided by the present application may be used to measure the BRDF of any object. Taking measuring the BRDF of the surface of a diffuse reflection plate as an example, the BRDF measurement system provided by the present application is illustrated.

Figure 3:
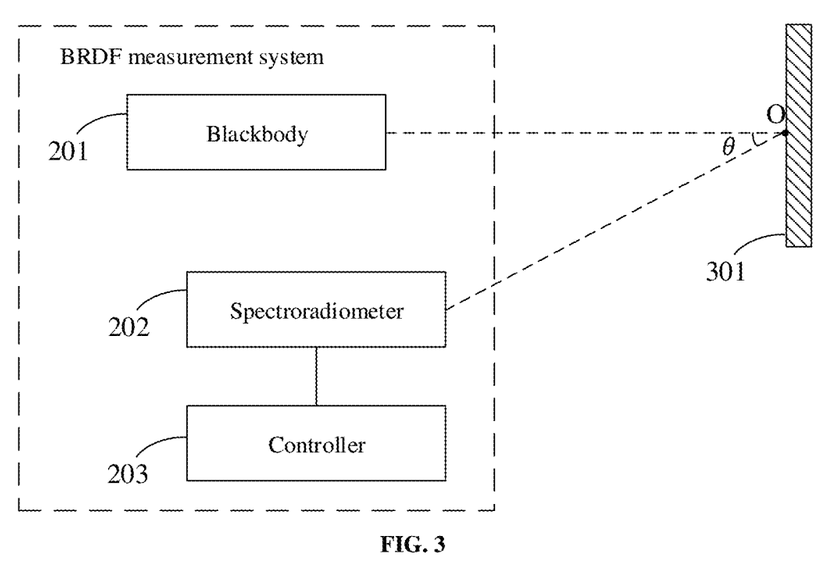
FIG. 3 is a schematic diagram of a principle of measuring BRDF using a BRDF measurement system according to the present application.

FIG. 3 is a schematic diagram of a principle of measuring BRDF using a BRDF measurement system according to the present application. As shown in FIG. 3, the spectroradiometer 202 is used to measure the radiation from the blackbody 201 and transmit a first measurement signal to the controller 203. In case that the blackbody 201 irradiates a to-be-measured point on a sample surface, the spectroradiometer 202 is further used to measure the radiation from the to-be-measured point, and transmit a second measurement signal to the controller 203.

It should be noted that, as shown in FIG. 3, the to-be-measured point on the sample surface in an embodiment of the present application may be denoted by O. The to-be-measured point may be any point on the surface of a diffuse reflection plate 301, and the to-be-measured point may also be a pre-determined point on the surface of the diffuse reflection plate 301 based on the actual situation.

It should be noted that the difference between the spectral radiance of the blackbody 201 and the spectral radiance of the to-be-measured point in case that the blackbody 201 irradiates the to-be-measured point is more than 3 orders of magnitude, which may even be as high as 4 to 5 orders of magnitude. In an embodiment of the present application, the detector is the spectroradiometer 202 that may perform full spectrum scanning on the blackbody 201.

The full spectrum refers to a curve of spectrum containing ultraviolet, visible and infrared light.

In an embodiment, the spectroradiometer 202 may be a wide-band array spectroradiometer.

Usually, a traditional BRDF system uses single wavelength light for measurement, and a linear measurement may only be performed within the dynamic range of the measurement value. However, the spectroradiometer 202 has a relatively low suppression of stray light.

In principle, the spectroradiometer 202 at wavelength $\lambda$ is only capable of receiving a light with a wavelength $\lambda$. However, in case that a light with a wavelength $\lambda_1$ irradiates the spectroradiometer 202, the spectroradiometer 202 at wavelength $\lambda$ may respond, and the responded value may be one ten-thousandth of that of the light with the wavelength $\lambda_1$.

When the spectroradiometer 202 measures two different light sources, in case that there is a difference in the relative spectral distributions of the two different light sources, the ratio of the two light sources measured by the spectroradiometer 202 are not equivalent to the true ratio of the two light sources.

The spectrum curve of the diffuse reflection plate 301 is flat, with a reflectance close to 1, which has almost the same shape as the spectrum curve of the blackbody 201. When the spectroradiometer 202 measures both the blackbody 201 and the to-be-measured point, the effect of in-band stray light can be ignored, and only the non-linear effect should be taken into account.

The controller 203 is used to obtain the BRDF of the to-be-measured point based on the first measurement signal, the second measurement signal, a target geometric relationship, a target mapping relationship and a dimension parameter of the blackbody 201.

The target geometric relationship includes a geometric relationship between the spectroradiometer 202, the blackbody 201 and the to-be-measured point; and the target mapping relationship includes sensitivities of the spectroradiometer 202 at different spectral radiances.

In an embodiment, after receiving the first measurement signal and the second measurement signal transmitted from the spectroradiometer 202, the controller 203 may calculate the BRDF of the to-be-measured point by means of numerical computation based on the first measurement signal, the second measurement signal, the target geometric relationship, the target mapping relationship and the dimension parameter of the blackbody 201.

It should be noted that the target geometric relationship, the target mapping relationship and the dimension parameter of the blackbody 201 may be pre-obtained by the controller 203.

The controller 203 may obtain the target geometric relationship, the target mapping relationship and the dimension parameter of the blackbody 201 in a variety of ways. For example, the controller 203 may obtain the dimension parameter of the blackbody radiation area based on a user input, and may further receive the target geometric relationship and the target mapping relationship transmitted from other electronic devices.

It should be noted that the target geometric relationship may include at least one of the following: a distance between a center point of the optical receiving surface of the spectroradiometer 202 and the to-be-measured point, a distance between a center point of the light-emitting port of the blackbody 201 and the to-be-measured point, an included angle between a first connecting line between the center point of the light-emitting port of the blackbody 201 and the to-be-measured point and the diffuse reflection plate 301, an included angle between a second connecting line between the center point of the optical receiving surface of the spectroradiometer 202 and the to-be-measured point and the diffuse reflection plate 301, and an angle between the first connecting line and the second connecting line.

It should be noted that the dimension parameter of the blackbody 201 include a radius of the light-emitting port of the blackbody 201.

Experiments have shown that a total duration of the BRDF measurement on the to-be-measured point on the surface of the diffuse reflection plate 301 using the BRDF measurement system provided by the present application is within 10 minutes, which is several times shorter than a duration of the BRDF measurement on the to-be-measured point on the surface of the diffuse reflection plate 301 using the conventional BRDF measurement system.

In an embodiment of the present application, the BRDF measurement system includes a blackbody that undergoes the solid-liquid phase change upon being heated to the target temperature, the spectroradiometer and the controller. By the BRDF measurement system, the BRDF of the to-be-measured point can be obtained based on the first measurement signal obtained by enabling the spectroradiometer to measure the blackbody, the second measurement signal obtained by enabling the spectroradiometer to measure the to-be-measured point in case that the blackbody irradiates the to-be-measured point, the geometric relationship between the spectroradiometer, the blackbody and the to-be-measured point, the sensitivities of the spectroradiometer at different spectral radiances, and the dimension parameter of the blackbody, which may improve the measurement accuracy and efficiency of the BRDF measurement.

Based on the above embodiments, the spectroradiometer 202 is provided with an eyepiece.

The spectroradiometer 202 may aim a position of the to-be-measured point based on the eyepiece.

The detector in the traditional BRDF measurement system does not have a targeting function, and it needs to undergo strict geometric positioning to ensure the accuracy of the BRDF measurement on the to-be-measured point, which is cumbersome and seriously affects the measurement efficiency of the BRDF measurement.

The spectroradiometer 202 according to the embodiments of the present application is provided with the eyepiece, and may aim the position of the to-be-measured point based on the eyepiece, which helps the spectroradiometer 202 to aim at the to-be-measured point more accurately and efficiently. The BRDF measurement may be performed more accurately and efficiently on the to-be-measured point based on the BRDF measurement system.

Based on the above embodiments, the BRDF measurement system further includes a nonlinear measurement device, which is connected to the controller 203.

The nonlinear measurement device is used to calibrate a linearity of the spectroradiometer 202, obtain the target mapping relationship, and transmit the target mapping relationship to the controller 203 before the spectroradiometer 202 measures the blackbody 201, and before the spectroradiometer 202 measures the to-be-measured point, in case that the blackbody 201 irradiates the to-be-measured point.

In an embodiment, before the spectroradiometer 202 measures the radiation from the blackbody 201 and measures radiation from the to-be-measured point, in case that the blackbody 201 irradiates the to-be-measured point, the nonlinear measurement device may calibrate the target mapping relationship.

During the linear calibration of the spectroradiometer 202 performed by the nonlinear measurement device, the dynamic range of measurement may cover at least 4 to 5 orders of magnitude, and at most 6 orders of magnitude.

By calibrating the linearity of the spectroradiometer 202, the nonlinear measurement device may obtain the sensitivities of the spectroradiometer 202 at different spectral radiances, and take it as the target mapping relationship.

After obtaining the target mapping relationship, the nonlinear measurement device may transmit the target mapping relationship to the controller 203.

In an embodiment of the present application, the BRDF measurement system further includes the nonlinear measurement device, which may calibrate the linearity of the spectroradiometer, take the obtained sensitivities of the spectroradiometer at different spectral radiances as the target mapping relationship, and transmit the target mapping relationship to the controller, which may obtain the target mapping relationship more accurately and efficiently.

Based on the above embodiments, fields of view provided by the spectroradiometer 202 includes a first field of view and a second field of view, where the first field of view is greater than the second field of view.

The spectroradiometer 202 uses the second field of view to measure the spectral radiance of the blackbody 201, and uses the first field of view to measure the spectral radiance of the to-be-measured point in case that the blackbody 201 irradiates the to-be-measured point.

In an embodiment, the spectroradiometer 202 according to the embodiments of the present application is internally integrated with an attenuator and may provide two different fields of view, which are a first field of view with a larger field of view and a second field of view with a smaller field of view.

For example, a range of signals receivable in the first field of view in an embodiment of the present application is 100 times a range of signals receivable in the second field of view.

It should be noted that the spectral radiance of blackbody 201 exceeds the upper measurement limit of the spectroradiometer 202. In an embodiment of the present application, the spectroradiometer 202 is internally integrated with the attenuator. When the spectroradiometer 202 performs the measurement using the second field of view, an upper measurement limit of the spectroradiometer 202 may cover the spectral radiance of the blackbody 201.

It should be noted that by designing an appropriate optical path, the spectral irradiance due to the radiation source and spectral radiance of the radiation source may be converted and calculated based on the geometric relationship between the radiation source, spectroradiomter and the to-be-measured point. The blackbody 201 and an integrating sphere light source both satisfy the above cases. However, the spectral radiance of the integrating sphere light source is more than 3 orders of magnitude lower than the spectral radiance of the blackbody 201, and the upper limit of the spectral radiance of the integrating sphere light source is 2 orders of magnitude lower than the upper measurement limit of the spectroradiometer 202 when the spectroradiometer 202 uses the second field of view for measuring.

In case that no attenuators are integrated within the spectroradiometer 202, although the spectroradiometer 202 may directly measure the integrating sphere light source, the spectral radiance generated on the surface of the diffuse reflection plate 301 is much weaker when the integrating sphere light source illuminates the surface of the diffuse reflection plate 301, and the spectroradiometer 202 fails to accurately measure the light signal with the such weak spectral radiance using the first field of view, and it is necessary to use the spectroradiometer 202 combined with a phase-locked amplifier to amplify and measure the light signal.

In an embodiment of the present application, the spectroradiometer 202 uses the second field of view with a smaller field of view to measure the blackbody 201, and uses the first field of view with a larger field of view to measure the to-be-measured point in case that the blackbody 201 irradiates the to-be-measured point, which enables a dynamic range that the spectroradiometer 202 could measure to cover at least 4 to 5 orders of magnitude, so as to cover the spectral radiance of the blackbody 201 and the spectral radiance of the to-be-measured point.

Based on the above embodiments, the controller is used to obtain the first spectral radiance based on the first measurement signal and the target mapping relationship, obtain the second spectral radiance based on the second measurement signal and the target mapping relationship, and then obtain the BRDF of the to-be-measured point based on the first spectral radiance, the second spectral radiance, the target geometric relationship and the dimension parameter of the blackbody.

In an embodiment, the included angle between the first connecting line and the diffuse reflection plate 301 may be represented by $\alpha$. The included angle between the first and second connecting lines be denoted by $\theta$, where the value range of $\theta$ is (0, 180).

Taking $\alpha$ being 90° and the included angle between the first and second connecting lines being $\theta$ as an example, the process of obtaining the BRDF of the to-be-measured point by the controller 203 is illustrated.

A measurement signal at the wavelength $\lambda$ in the first measurement signal may be denoted by $s_1(\lambda)$.

A measurement signal at the wavelength $\lambda$ in the second measurement signal may be denoted by $s_2(\lambda)$.

The spectral radiance of the blackbody 201 at the wavelength $\lambda$ may be denoted by $L_1(\lambda)$.

In case that the blackbody 201 irradiates the to-be-measured point, the spectral radiance of the light with the wavelength $\lambda$ reflected from the to-be-measured point may be denoted by $L_2(\lambda)$.

In case that the spectral radiance is $L_1(\lambda)$, the sensitivity of the spectroradiometer 202 may be denoted by $R_1(\lambda)$.

In case that the spectral radiance is $L_2(\lambda)$, the sensitivity of the spectroradiometer 202 may be denoted by $R_2(\lambda)$.

The controller 203 may determine $R_1(\lambda)$ and $R_2(\lambda)$ based on the target mapping relationship.

Based on $s_1(\lambda)$ and $R_1(\lambda)$, the controller 203 may calculate $L_1(\lambda)$ by the following formula:

$$L_1(\lambda)=s_1(\lambda)/R_1(\lambda). \quad (2)$$

Based on $s_2(\lambda)$ and $R_2(\lambda)$, the controller 203 may calculate $L_2(\lambda)$ by the following formula:

$$L_2(\lambda)=s_2(\lambda)/R_2(\lambda). \quad (3)$$

It should be noted that, in case that the spectroradiometer 202 has nonlinear errors, $R_1(\lambda)$ and $R_2(\lambda)$ have the following relationship:

$$R_2(\lambda)=R_1(\lambda)+\delta(\lambda), \quad (4)$$

where $\delta(\lambda)$ denotes a nonlinear correction value for the spectroradiometer 202 in case that the spectral radiance is $L_2(\lambda)$, and the specific value of $\delta(\lambda)$ may be determined based on design parameters and performance parameters of the spectroradiometer 202.

After calculating $L_1(\lambda)$ and $L_2(\lambda)$, the controller 203 may calculate the BRDF $\rho(\lambda)$ of the to-be-measured point at wavelength $\lambda$ based on $L_1(\lambda)$ and $L_2(\lambda)$, the distance l between the center point of the light-emitting port of the blackbody 201 and the to-be-measured point, and the radius r of the light-emitting port of the blackbody 201. The specific calculation formula is as follows:

$$\rho(\lambda) = \frac{L_2(\lambda) \cdot l^2}{L_1(\lambda) \cdot r^2}. \quad (5)$$

The formulas (2) and (3) are substituted into formula (5) to obtain:

$$\rho(\lambda) = \frac{s_2(\lambda) \cdot R_1(\lambda) \cdot l^2}{s_1(\lambda) \cdot R_2(\lambda) \cdot r^2}. \quad (6)$$

The relationship between $R_1(\lambda)$ and $R_2(\lambda)$ is determined by the formula (4).

$\rho(\lambda)$ may be calculated based on the formula (6).

It should be noted that, in case that the included angle between the first connecting line and the diffuse reflection plate 301 is not 90°, an included angle between the first connecting line and a normal line of the diffuse reflection plate 301 may be denoted by $\alpha_1$, and an included angle between a third connecting line and the horizontal direction may be denoted by $\beta_1$, where the third line is a connecting line between the vertical projection point of the center point of the light-emitting port of the blackbody 201 on the diffuse reflection plate 301 and the to-be-measured point. The coordinates of the center point of the light-emitting port of the blackbody 201 may be denoted by $(\alpha_1, \beta_1)$.

Correspondingly, an included angle between the second connecting line and the normal line of the diffuse reflection plate 301 may be denoted by $\alpha_2$, and an included angle between a fourth connecting line and the horizontal direction may be denoted by $\beta_2$, where the fourth connecting line is a line between a vertical projection point of the center point of the optical receiving surface of the spectroradiometer 202 on the diffuse reflection plate 301 and the to-be-measured point. The coordinates of the center point of the optical receiving surface of the spectroradiometer 202 may be denoted by $(\alpha_2, \beta_2)$.

Based on the formulas (2) to (6), the BRDF $\rho(\lambda)$ of the to-be-measured point at wavelength $\lambda$ may be calculated in case that the included angle between the first connecting line and the diffuse reflection plate 301 is $\alpha$ and the included angle between the first connecting line and the second connecting line is $\theta$.

It should be noted that the calculation of the BRDF is associated with the spectral irradiance and the spectral radiance. When measuring the BRDF of the to-be-measured point on the surface of the diffuse reflection plate 301 based on the BRDF system provided by the present application, on the one hand, it is necessary to accurately measure the spectral irradiance of the blackbody 201, on the other hand, the measurement of spectral radiance of light reflected from the to-be-measured point involves the measurements of the target geometrical relationship and the radiation signal in case that the blackbody 201 irradiates the to-be-measured point.

In the process of measuring BRDF of the to-be-measured point on the surface of the diffuse reflection plate 301 based on the BRDF system provided by the present application, the measurement accuracy of the BRDF not only involves the measurement accuracy of the target geometric relationship and radiation information, but also involves the measurement accuracy of the blackbody 201.

In an embodiment of the present application, the spectral radiance at two radiation levels may be offset, and the final BRDF measurement is only associated with the target geometric relationship. The measurement accuracy of the geometric relationship is higher than the measurement accuracy of the spectral irradiance. The unit of spectral irradiance $W/m^2$ already involves two quantities: a power and an area.

In an embodiment of the present application, the controller may calculate the BRDF of the to-be-measured point more efficiently and accurately by means of numerical calculation, which may further improve the measurement accuracy and efficiency of the BRDF measurement system.

Based on the above embodiments, the BRDF measurement system further includes: a measurement device connected to the controller 203.

The measurement device is used to obtain relative position information between the blackbody 201, the spectroradiometer 202 and the to-be-measured point in case that the blackbody 201 irradiates the to-be-measured point, and transmits the relative position information to the controller 203.

The controller 203 is used to obtain the target geometric relationship based on the relative position information.

In an embodiment, the measurement device according to embodiments of the present application may measure the relative position between the blackbody 201, the spectroradiometer 202 and the to-be-measured point through an infrared sensor, an image sensor, etc., and transmit the measured relative position information to the controller 203.

After receiving the relative position information transmitted from the measurement device, the controller 203 may obtain the geometric relationship between the spectroradiometer 202, the blackbody 201 and the to-be-measured point by numerical calculation based on the relative position information, and take it as the target geometric relationship.

The BRDF measurement according to an embodiment of the present application further includes the measurement device. Based on the measurement device, the BRDF measurement system may automatically obtain the geometric relationship between the spectroradiometer, the blackbody and the to-be-measured point, and take it as the target geometric relationship, which may improve the automation level of the BRDF measurement system.

Based on the above embodiments, the BRDF measurement system further includes: a mechanical device connected to the controller 203, and further connected to the blackbody 201 and the spectroradiometer 202.

The controller 203 is used to obtain the target geometric relationship based on a user input and transmit a control instruction corresponding to the target geometric relationship to the mechanical device.

The mechanical device is used to control a position of the blackbody 201 and/or the spectroradiometer 202 in response to the control instruction.

In an embodiment, a user may determine the target geometric relationship based on actual needs.

After determining the target geometric relationship, the user may input the target geometric relationship to the controller 203.

The controller 203 may obtain the target geometric relationship based on the user input and generate the control instruction corresponding to the target geometric relationship.

After the controller 203 generates the control instruction corresponding to the target geometric relationship, it may transmit the control instruction to the mechanical device.

After receiving the control instruction, the mechanical device may control the position of the blackbody 201 and/or the spectroradiometer 202 in response to the control instruction, to make the geometric relationship between the blackbody 201, the spectroradiometer 202 and the to-be-measured point be the target geometric relationship.

In an embodiment of the present application, the BRDF measurement system further includes the mechanical device that may automatically control the position of the blackbody and/or the spectroradiometer based on the target geometric relationship determined by the user, and may improve the automation level of the BRDF measurement system.

Figure 4:
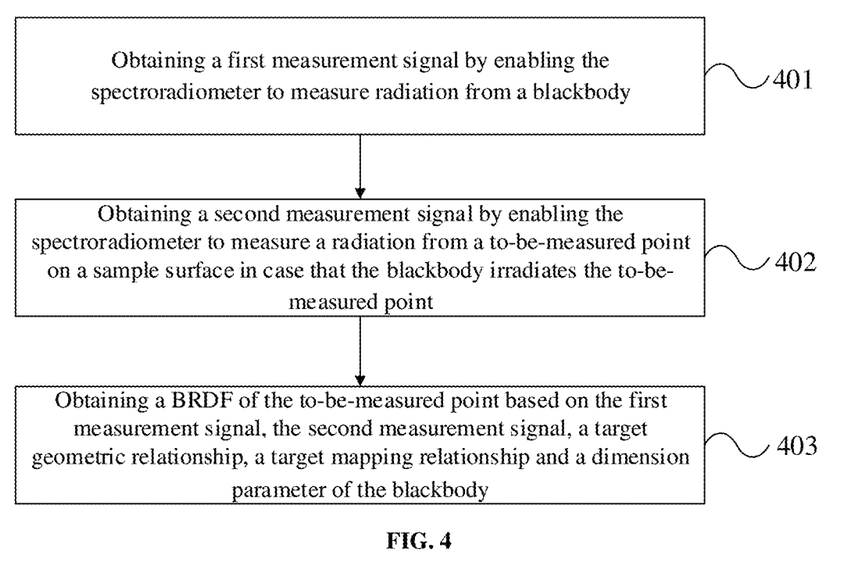
FIG. 4 is a schematic flowchart of a BRDF measurement method according to the present application.

FIG. 4 is a schematic flowchart of a BRDF measurement method according to the present application. The BRDF measurement method according to the present application is described below in conjunction with FIG. 4. As shown in FIG. 4, the method includes the following steps.

Step 401: obtaining a first measurement signal by enabling the spectroradiometer 202 to measure radiation from a blackbody 201.

Step 402: obtaining a second measurement signal by enabling the spectroradiometer 202 to measure a radiation from the to-be-measured point on a sample surface in case that the blackbody 201 irradiates the to-be-measured point.

Step 403: obtaining a BRDF of the to-be-measured point based on the first measurement signal, the second measurement signal, the target geometric relationship, a target mapping relationship and a dimension parameter of the blackbody 201.

The target geometric relationship includes the geometric relationship between the spectroradiometer 202, the blackbody 201, and the to-be-measured point, where the target mapping relationship includes sensitivities of the spectroradiometer 202 at different spectral radiances.

It should be noted that the BRDF measurement method is performed by the BRDF measurement system provided by the present application. The BRDF measurement method according to the present application may only measure BRDF of the to-be-measured point by using the BRDF measurement system provided by the present application.

It should be noted that the specific process of the BRDF measurement method according to the present application may be referred to in the above embodiments, which is not repeated in embodiments of the present application.

Based on the above embodiments, before the obtaining the first measurement signal, the BRDF measurement method further includes: calibrating the linearity of the spectroradiometer 202, and obtaining the target mapping relationship between sensitivities of the spectroradiometer 202 at different spectral radiances.

In an embodiment of the present application, the BRDF of the to-be-measured point can be obtained based on the first measurement signal obtained by enabling the spectroradiometer to measure the radiation from the blackbody, the second measurement signal obtained by enabling the spectroradiometer to measure the radiation from the to-be-measured point in case that the blackbody irradiates the to-be-measured point, the geometric relationship between the spectroradiometer, the blackbody and the to-be-measured point, the sensitivities of the spectroradiometer at different spectral radiances, and the dimension parameter of the blackbody, which may improve the measurement accuracy and efficiency of the BRDF measurement.

Figure 5:
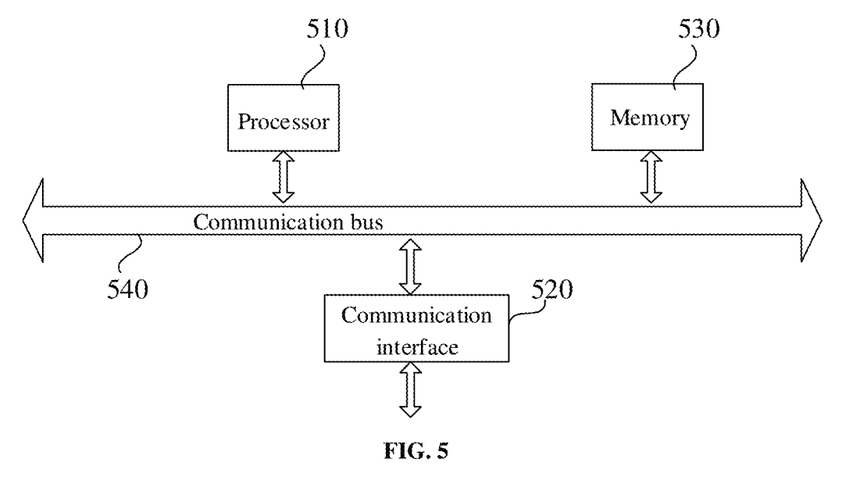
FIG. 5 is a schematic structural diagram of an electronic device according to the present application.

FIG. 5 is a schematic structural diagram of an electronic device according to the present application. As shown in FIG. 5, the electronic device may include: a processor 510, a communication interface 520, a memory 530 and a communication bus 540. The processor 510, the communication interface 520 and the memory 530 communicate with each other through the communication bus 540. The processor 510 may call the logical instructions in the memory 530 to perform the BRDF measurement method, which includes: obtaining a first measurement signal by enabling the spectroradiometer 202 to measure radiation from a blackbody 201; obtaining a second measurement signal by enabling the spectroradiometer 202 to measure radiation from a to-be-measured point on a sample surface in case that the blackbody 201 irradiates the to-be-measured point; and obtaining a BRDF of the to-be-measured point based on the first measurement signal, the second measurement signal, a target geometric relationship, a target mapping relationship and a dimension parameter of the blackbody 201, where the target geometric relationship includes the geometric relationship between the spectroradiometer 202, the blackbody 201 and the to-be-measured point, where the target mapping relationship includes a sensitivities of the spectroradiometer 202 at different spectral radiances.

The logical instructions in the memory 530 may be stored in a computer readable storage medium in case that it is implemented in the form of a software functional unit and sold or used as a separate product. Based on this understanding, the solutions of the present application in essence, or the part contributing to the related art, or part of the solutions may be embodied in the form of a software product, which is stored in a storage medium and includes several instructions to enable a computer device (which may be a personal computer, a server, or a network device, etc.) to perform all or part of the steps of the methods described in various embodiments of the present application. The aforementioned storage medium includes: USB flash disk, movable hard drives, read-only memory (ROM), random access memory (RAM), magnetic disks, or optical discs, and other media that may store program code.

The present application further provides a computer program product, which includes a computer program that may be stored on a non-transitory computer-readable storage medium. In case that the computer program is executed by the processor, the computer may perform the BRDF measurement method provided by the above methods, which includes: obtaining a first measurement signal by enabling the spectroradiometer 202 to measure radiation from a blackbody 201; obtaining a second measurement signal by enabling the spectroradiometer 202 to measure radiation from a to-be-measured point on a sample surface in case that the blackbody 201 irradiates the to-be-measured point; and obtaining a BRDF of the to-be-measured point based on the first measurement signal, the second measurement signal, a target geometric relationship, a target mapping relationship and a dimension parameter of the blackbody 201, where the target geometric relationship includes the geometric relationship between the spectroradiometer 202, the blackbody 201 and the to-be-measured point, where the target mapping relationship includes sensitivities of the spectroradiometer 202 at different spectral radiances.

The present application further provides a non-transitory computer-readable storage medium having stored the computer program that is implemented when executed by the processor to perform the BRDF measurement method provided by the above methods, which includes: obtaining a first measurement signal by enabling the spectroradiometer 202 to measure radiation from a blackbody 201; obtaining a second measurement signal by enabling the spectroradiometer 202 to measure radiation from a to-be-measured point on a sample surface in case that the blackbody 201 irradiates the to-be-measured point; and obtaining a BRDF of the to-be-measured point based on the first measurement signal, the second measurement signal, a target geometric relationship, a target mapping relationship and a dimension parameter of the blackbody 201, where the target geometric relationship includes the geometric relationship between the spectroradiometer 202, the blackbody 201 and the to-be-measured point, where the target mapping relationship includes a sensitivities of the spectroradiometer 202 at different spectral radiances.

The apparatus embodiments described above are only schematic, where the units described as separate components may be physically separated or not, and the components displayed as units may be physical units or not, that is, they may be located at one place or be distributed across multiple network units. Some or all modules may be selected according to actual needs to achieve the purpose of the embodiment scheme. They may be understood and implemented without creative work for those ordinary skilled technical personnel in the art.

Through the description of the above implementations, it is clear to those skilled technical personnel in the art that the implementations may be achieved through software and necessary universal hardware platforms, and it may also be achieved through hardware. Based on this understanding, the above solutions of the present application in essence, or the part contributing to the related art may be embodied in the form of the software product, which may be stored in a computer-readable storage medium such as a ROM/RAM, a magnetic disk, an optical disk, etc., and includes several instructions to enable a computer device (which may be a personal computer, a server, or a network device, etc.) to perform the methods described in all or part of the embodiments of the present application.

It should be noted that the above embodiments are only used to illustrate the solutions of the present application, not to limit them. Although the present application has been described in detail with reference to the foregoing embodiments, those ordinary skilled technical personnel in the art should understand that it is possible to make modifications to the solutions documented in the foregoing embodiments, or to make equivalent replacements for some of the technical features; and these modifications or replacements do not separate the essence of the corresponding solutions from the spirit and scope of the various embodiments of the present application.

What is claimed is:

1. A bidirectional reflectance distribution function (BRDF) measurement system, comprising a blackbody, a spectroradiometer and a controller,
    wherein the spectroradiometer is connected to the controller; and
    wherein, when the blackbody is heated to a target temperature:
        the blackbody undergoes a solid-liquid phase change;
        the spectroradiometer measures the blackbody and transmits a first measurement signal to the controller, and when the blackbody irradiates a to-be-measured point on a sample surface, the spectroradiometer measures the to-be-measured point and transmits a second measurement signal to the controller; and
        the controller obtains a BRDF of the to-be-measured point based on the first measurement signal, the second measurement signal, a target geometric relationship, a target mapping relationship and a dimension parameter of the blackbody,
    wherein the target geometric relationship comprises a geometric relationship between the spectroradiometer, the blackbody, and the to-be-measured point, wherein the target mapping relationship includes a mapping relationship between sensitivities of the spectroradiometer at different spectral radiances.

2. The system of claim 1, wherein the spectroradiometer comprises an eyepiece, and wherein the spectroradiometer is aimed at a position of the to-be-measured point by using the eyepiece.

3. The system of claim 1, further comprising a nonlinear measurement device connected to the controller,
    wherein the nonlinear measurement device is used to calibrate a linearity of the spectroradiometer, obtain the target mapping relationship, and transmit the target mapping relationship to the controller before the spectroradiometer measures radiation from the blackbody and before the spectroradiometer measures radiation from the to-be-measured point when that the blackbody irradiates the to-be-measured point.

4. The system of claim 1, wherein a plurality of fields of view provided by the spectroradiometer comprise a first field of view and a second field of view, wherein the first field of view is greater than the second field of view, and
    wherein the spectroradiometer uses the second field of view to measure radiation from the blackbody, and
    wherein the spectroradiometer uses the first field of view to measure radiation from the to-be-measured point when the blackbody irradiates the to-be-measured point.

5. The system of claim 1, further comprising a measurement device connected to the controller,
    wherein the measurement device obtains relative position information between the blackbody, the spectroradiometer and the to-be-measured point when the blackbody irradiates the to-be-measured point, and transmits the relative position information to the controller, and
    wherein the controller obtains the target geometric relationship based on the relative position information.

6. The system of claim 1, further comprising a mechanical device connected to the controller, and further connected to the blackbody and the spectroradiometer,
    wherein the controller is configured to obtain the target geometric relationship based on a user input and transmit a control instruction corresponding to the target geometric relationship to the mechanical device, and
    wherein the mechanical device is configured to control a position of the blackbody and/or the spectroradiometer in response to the control instruction.

7. The system of claim 1, wherein the controller is configured to obtain a first spectral radiance based on the first measurement signal and the target mapping relationship, obtain a second spectral radiance based on the second measurement signal and the target mapping relationship, and then obtain the BRDF of the to-be-measured point based on the first spectral radiance, the second spectral radiance, the target geometric relationship and the dimension parameter of the blackbody.

8. A bidirectional reflectance distribution function (BRDF) measurement method, performed by the BRDF measurement system of claim 1, the measurement method comprising:
    obtaining the first measurement signal by enabling the spectroradiometer to measure radiation from the blackbody;
    obtaining the second measurement signal by enabling the spectroradiometer to measure radiation from the to-be-measured point on the sample surface when the blackbody irradiates the to-be-measured point; and
    obtaining the BRDF of the to-be-measured point based on the first measurement signal, the second measurement signal, the target geometric relationship, the target mapping relationship, and the dimension parameter of the blackbody,
    wherein the target geometric relationship comprises the geometric relationship between the spectroradiometer, the blackbody, and the to-be-measured point, wherein the target mapping relationship comprises the sensitivities of the spectroradiometer at different spectral radiances.

9. An electronic device, comprising a memory storing computer programs and a processor, wherein the computer programs, when executed by the processor, cause the electronic device to perform the bidirectional reflectance distribution function (BRDF) measurement method of claim 8.

10. A non-transitory computer readable storage medium having a computer program stored thereon, wherein the computer program, when executed by the processor, causes the processor to perform the bidirectional reflectance distribution function (BRDF) measurement method of claim 9.

\* \* \* \* \*